United States Patent
Dubrovsky et al.

(10) Patent No.: US 9,462,012 B2
(45) Date of Patent: Oct. 4, 2016

(54) NOTIFICATION FOR REASSEMBLY-FREE FILE SCANNING

(71) Applicant: DELL SOFTWARE INC., Round Rock, TX (US)

(72) Inventors: Aleksandr Dubrovsky, San Mateo, CA (US); Igor Korsunsky, Sunnyvale, CA (US); Roman Yanovsky, Los Altos, CA (US); Boris Yanovsky, Saratoga, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

(21) Appl. No.: 14/475,441

(22) Filed: Sep. 2, 2014

(65) Prior Publication Data

US 2014/0373156 A1 Dec. 18, 2014

Related U.S. Application Data

(63) Continuation of application No. 11/837,779, filed on Aug. 13, 2007, now Pat. No. 8,863,286.

(60) Provisional application No. 60/932,953, filed on Jun. 5, 2007.

(51) Int. Cl.
*G06F 11/00* (2006.01)
*G06F 12/14* (2006.01)
(Continued)

(52) U.S. Cl.
CPC ............ *H04L 63/145* (2013.01); *G06F 21/56* (2013.01); *G06F 21/561* (2013.01); *G06F 21/562* (2013.01); *G06F 2221/2119* (2013.01)

(58) Field of Classification Search
CPC ............ H04L 63/145; H04L 63/1408; H04L 63/1483; G06F 21/56
USPC .......................... 726/11–22, 22–25; 713/188
See application file for complete search history.

(56) References Cited

U.S. PATENT DOCUMENTS 5,623,600 A * 4/1997 Ji et al. ........................... 726/24
5,796,942 A 8/1998 Esbensen
(Continued)

FOREIGN PATENT DOCUMENTS

| EP | 1 122 932 | 8/2001 |
| EP | 1 528 743 | 5/2005 |
| WO | WO 97/39399 | 10/1997 |

OTHER PUBLICATIONS

Aggarwal, N., "Improving the Efficiency of Network Intrusion Detection Systems" Indian Institute of Technology, May 3, 2006, pp. 1-40.

(Continued)

*Primary Examiner* — Shewaye Gelagay
*Assistant Examiner* — Trong Nguyen
(74) *Attorney, Agent, or Firm* — Polsinelli LLP (57) ABSTRACT

Techniques for notification of reassembly-free file scanning are described herein. According to one embodiment, a first request for accessing a document provided by a remote node is received from a client. In response to the first request, it is determined whether a second request previously for accessing the document of the remote node indicates that the requested document from the remote node contains offensive data. If the requested document contains offensive data, a message is returned to the client, without accessing the requested document of the remote node, indicating that the requested document is not delivered to the client.

20 Claims, 8 Drawing Sheets

(51) Int. Cl.

| | | |
|---|---|---|
| G06F 12/16 | (2006.01) | |
| G06F 9/00 | (2006.01) | |
| G06F 15/16 | (2006.01) | |
| G06F 17/00 | (2006.01) | |
| G08B 23/00 | (2006.01) | |
| H04L 29/06 | (2006.01) | |
| G06F 21/56 | (2013.01) | |

(56) References Cited

U.S. PATENT DOCUMENTS

| | | | |
|---|---|---|---|
| 5,945,933 | A | 8/1999 | Kalkstein |
| 6,088,803 | A * | 7/2000 | Tso et al. ................. 726/22 |
| 6,108,782 | A | 8/2000 | Fletcher et al. |
| 6,119,236 | A | 9/2000 | Shipley |
| 6,178,448 | B1 | 1/2001 | Gray et al. |
| 6,219,706 | B1 | 4/2001 | Fan et al. |
| 6,449,723 | B1 | 9/2002 | Elgressy et al. |
| 6,851,061 | B1 | 2/2005 | Holland et al. |
| 7,134,143 | B2 | 11/2006 | Stellenberg et al. |
| 7,152,164 | B1 * | 12/2006 | Loukas ................. 713/188 |
| 7,185,368 | B2 | 2/2007 | Copeland |
| 7,304,996 | B1 | 12/2007 | Swenson et al. |
| 7,849,502 | B1 * | 12/2010 | Bloch et al. .............. 726/11 |
| 8,863,286 | B1 | 10/2014 | Dubrovsky |
| 2001/0042171 | A1 * | 11/2001 | Vermeulen ............... 711/118 |
| 2002/0083331 | A1 | 6/2002 | Krumel |
| 2003/0084328 | A1 | 5/2003 | Tarquini et al. |
| 2003/0110208 | A1 | 6/2003 | Wyschogrod et al. |
| 2003/0145228 | A1 | 7/2003 | Suuronen et al. |
| 2003/0154399 | A1 | 8/2003 | Zuk et al. |
| 2004/0093513 | A1 | 5/2004 | Cantrell et al. |
| 2004/0123155 | A1 | 6/2004 | Etoh et al. |
| 2004/0172551 | A1 * | 9/2004 | Fielding ............. G06F 21/564 726/24 |
| 2004/0199790 | A1 | 10/2004 | Lingafelt et al. |
| 2004/0255163 | A1 | 12/2004 | Swimmer et al. |
| 2005/0120243 | A1 | 6/2005 | Palmer et al. |
| 2005/0216770 | A1 | 9/2005 | Rowett et al. |
| 2005/0262556 | A1 | 11/2005 | Waisman et al. |
| 2006/0020595 | A1 | 1/2006 | Norton et al. |
| 2006/0069787 | A1 | 3/2006 | Sinclair |
| 2007/0058551 | A1 | 3/2007 | Brusotti et al. |
| 2008/0034073 | A1 | 2/2008 | McCloy et al. |
| 2008/0082662 | A1 | 4/2008 | Dandliker et al. |
| 2008/0256622 | A1 | 10/2008 | Neystadt et al. |
| 2008/0263659 | A1 * | 10/2008 | Alme ..................... 726/22 |

OTHER PUBLICATIONS

Bellovin, S., "Firewall-Friendly FTP," Network Working Group, RFC No. 1579, AT&T Bell Laboratories, Feb. 1994, http://www.ietf.org/rfc1579.txt?number=1579, downloaded Jul. 15, 2002, 4 pages.
Blyth, Andrew, "Detecting Intrusion", School of Computing, University of Glamorgan, 14 pages.
Branch, Joel, "Denial of Service Intrusion Detection Using Time Dependent Deterministic Finite Automata," RPI Graduate Research Conference 2002, Oct. 17, 2002, 7 pages.
Gateway Anti-Virus, Anti-Spyware and Intrusion Prevention Service, Unified Threat Management, Intelligent Real-time Protection, 2 pp.
Juniper Networks, "Architecture," www.juniper.net/products/intrusion/architecture.html, downloaded Jun. 11, 2004, 3 pages.
Juniper Networks, "Attack Detection," www.juniper.net/products/intrusion/detection.html, downloaded Jun. 11, 2004, 7 pages.
Juniper Networks, "Attack Prevention," www.juniper.net/products/intrusion/prevention.html, downloaded Jun. 11, 2004, 2 pages.
Juniper Networks, "Intrusion Detection and Prevention," www.juniper.net/products/intrusion/ downloaded Jun. 11, 2004, 2 pages.
Kruegal, Christopher, "Using Decision Trees to Improve Signature-Based Intrusion Detection", Sep. 8, 2003, RAID 2003: recent Advance in Intrusion Detection, 20 pages.
Lucas, Simon M., "Learning Deterministic Finite Automata with a Smart State Labeling Evolutionary Algorithm," IEEE Transaction on Pattern Analysis and Machine Intelligence, vol. 27, No. 7, Jul. 2005, pp. 1063-10740.
Roberts, Paul, "NetScreen Anounces Deep Inspection Firewall," IDG News Service, Oct. 20, 2003, http:www.nwfusion.com/news/2003/1020netscannou.html, downloaded Jun. 11, 2004, 5 pages.
Roesch, Martin and Green, Chris, "Snort Users Manual," Snort Release 2.0.0, M. Roesch, C. Green, Copyright 1998-2003 M. Roesch, Copyright 2001-2003 C. Green, Copyright 2003 Sourcefire, Inc. dated Dec. 8, 2003 (53 pgs).
"The Ultimate Internet Sharing Solution, WinProxy, User Manual," Copyright 1996-2002 Osistis Software, Inc., dated Feb. 2002 (290 pgs).
Snort.org, "The Open Sourrce Network Intrusion Detection System," www.snort.org/about.html, 2 pages.
SonicWALL Complete Anti-Virus, Automated and Enforced Anti-Virus Protection, 2 pp.
"SonicWALL Content Filtering Service", Comprehensive Internet Security™, 2 pp.
SonicWALL Endpoint Security: Anti-Virus, Automated and Enforced Anti-Virus and Anti-Spyware Protection, 2 pp.
SonicWALL Internet Security Appliances, "Content Security Manager Integrated Solutions Guide", Version 3.0, 2007, 160 pp.
SonicWALL Internet Security Appliances, "SonicOS 3.8 Standard Administrator's Guide", 2007, 362 pp.
SonicOS Standard 3.8.0.2 Release Notes, SonicWALL secure Anti-Virus Router 80 Series SonicWALL, Inc., Software Release: Apr. 11, 2007, 13 pp.
Van Engelen, R., "Constructing Finite State Automata for High-Perfomance XML Web Services," International Symposium on Web Services and Applications, 2004, pp. 1-7.
U.S. Appl. No. 11/837,779; Office Action mailed Dec. 4, 2013.
U.S. Appl. No. 11/837,779; Final Office Action mailed Feb. 18, 2011.
U.S. Appl. No. 11/837,779; Office Action mailed Sep. 13, 2010.

* cited by examiner

| URL/Address 501 | Information Regarding Offensive Data 502 |
|---|---|
| --- | --- |
| --- | --- |
| . . . | . . . |
| --- | --- |

Receive a message indicating that an attempt to access a document (e.g., Web page) of a remote facility (e.g., Web server) has been terminated because the document contains offensive data (e.g., virus or spyware).
601

Extract the address of the remote facility and/or URL of the document, and the information identifying the offensive data.
602

Optionally perform a hash function (e.g., SHA-1 or MD5) on the extracted address, URL, and information identifying the offensive.
603

Store the hashed information in a data structure to be used in subsequent accesses to the same document of the remote facility.
604

NOTIFICATION FOR REASSEMBLY-FREE FILE SCANNING

CROSS-REFERENCE TO RELATED APPLICATIONS

This application is a continuation and claims the priority benefit of U.S. patent application Ser. No. 11/837,779 filed Aug. 13, 2007, which claims the benefit of U.S. provisional application 60/932,953 filed Jun. 5, 2007, the disclosures of which are incorporated herein by reference.

FIELD OF THE INVENTION

The present invention relates generally to anti-virus protection. More particularly, this invention relates to notification for reassembly-free file scanning of anti-virus protection.

BACKGROUND

A computer virus is a self-replicating program designed to spread without user intervention or knowledge. Computer viruses are spread by attaching themselves to another program, such as a macro attached to e-mail. A worm is a type of computer virus that can transmit itself to a second computer over a network. The increased access to e-mail at the workplace has allowed viruses and worms to spread at a much faster rate. The number of viruses "in the wild," or present in more than one company or organization, has increased dramatically since widespread Internet access has become available.

Most companies allow Internet access by creating a local area network (LAN). Access to the LAN by the Internet is protected by a "firewall". Such a network allows programs on one computer to be accessed by all the computers on the LAN. Unfortunately, this access means that once a virus infects one computer, all the other computers in a LAN may soon be infected as well.

The standard protection against virus is an anti-virus software application that analyzes software applications and isolates any latent viruses. This anti-virus software has a set of virus characteristics that the software searches for in the computer. Each time a new virus is created or evolved, a new anti-virus characteristic must be updated to the computer in order for the anti-virus software to detect the virus.

In general, anti-virus software may be installed directly into the firewall of a gateway device. The firewall attempts to scan for viruses on the fly while the client computer is receiving the data and then aborts the transfer if a virus is detected. However, when the anti-virus software detects that the data contains a virus, a portion of the data has already been received by the client. When the connection is terminated, the client would not know the reasons behind the termination of the connection (e.g., because of a virus).

SUMMARY OF THE DESCRIPTION

Techniques for notification of reassembly-free file scanning are described herein. According to one embodiment, a first request for accessing a document provided by a remote node is received from a client. In response to the first request, it is determined whether a second request previously for accessing the document of the remote node indicates that the requested document from the remote node contains offensive data. If the requested document contains offensive data, a message is returned to the client, without accessing the requested document of the remote node, indicating that the requested document is not delivered to the client.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for notification of reassembly-free file scanning are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

When a file such as an HTTP (hypertext transport protocol) file is downloaded and scanned for viruses without reassembling the entire file (e.g., sending a portion of the file to a client while scanning the remaining portion of the file for viruses), it is challenging to notify the client if the virus were detected and prevented in a user-friendly manner (e.g., by showing an HTML or hypertext markup language block page in addition to terminating the connection). According to one embodiment, the HTTP clientless notification feature is designed to address a user's frustration of TCP (transport control protocol) connection being reset if security threat is detected during an HTTP transaction. Conventionally, when connection is reset, the user does not know what could be the reasons behind the connection termination. According to one embodiment, the HTTP clientless notification feature allows a user to see a block page on the subsequent access (e.g., refresh) of the same file with information about a virus or a spyware that was detected. The term of "clientless" is referred to the situation that a user or a client machine does not need to install or maintain client software in order to download a document from a remote node. For example, only a Web browser is needed to access a Web server to download a Web page or file from the Web server.

Note that throughout this application, a HTML or Web page is used as an example of a document and a Web server is used as an example of a remote facility hosting the document; however, other types of documents may also be applied. Also note that throughout this application, a virus and/or spyware is used as an example of offensive data; however, other types of offensive data may also be applied.

According to one embodiment, antivirus protection software is installed in a network access device such as a gateway device with a data structure to maintain any previous failed requests for access certain documents of remote nodes that have been detected to have offensive data such as viruses or spywares. When the viruses and/or spywares are detected, the connection is terminated and the information regarding the requested document and/or remote node (e.g., URL and/or IP address) is stored and maintained within the data structure. When the user or client subsequently tries to access the same document of the same remote node (e.g., refresh), the information of the viruses or spywares associated with the requested document may be retrieved from the data structure. A description of this information such as the reasons regarding why the current and previous connections would be terminated without accessing the requested document. As a result, a user or client would know why the document cannot be accessed or the network connection was terminated.

Figure 1:
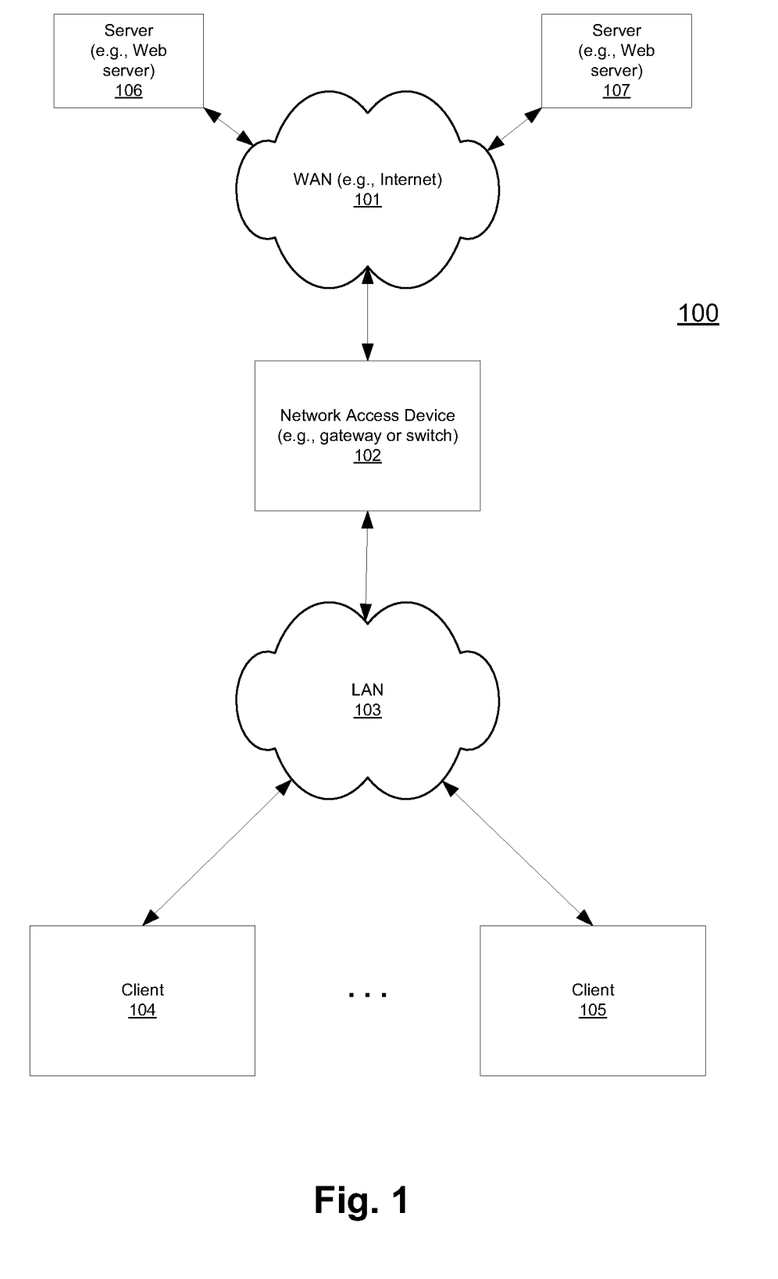
FIG. 1 is a block diagram of a network configuration which may be implemented with one embodiment of the invention.

FIG. 1 is a block diagram of a network configuration which may be implemented with one embodiment of the invention. Referring to FIG. 1, in one embodiment, the network configuration 100 includes a network access device 102 providing network access services for one or more clients 104-105 over a local area network 103. In order to access a remote facilities 106-107 (e.g., Web servers) over an external network 101, each of the clients 104-105 has to go through the network access device 102 and optionally, a network service provider (e.g., an Internet service provider or ISP) in order to access remote facilities 106-107.

In one embodiment, the connection between the network access device 102 and the external network 101 may be a wired connection. Alternatively, such a connection may be a wireless connection; for example, a satellite or an IEEE 802.1x compatible connection. The external network 101 may be a wide area network (WAN), such as, for example, the Internet. The LAN 103 may be a home network using an IEEE 802.1x compatible protocol. Alternatively, the LAN 103 may be a local network within an organization (e.g., an Intranet). The LAN 103 may be a wired or wireless network, or a combination of both, using a variety of network protocols, such as, Ethernet and/or IEEE 802.1x compatible protocols, such as, for example, Wi-Fi and/or Bluetooth protocols. Wireless connections may include both RF and non-RF links, for example, an IR link. Wired connections may include both electrical and non-electrical links, for example, fiber optic links.

Figure 2:
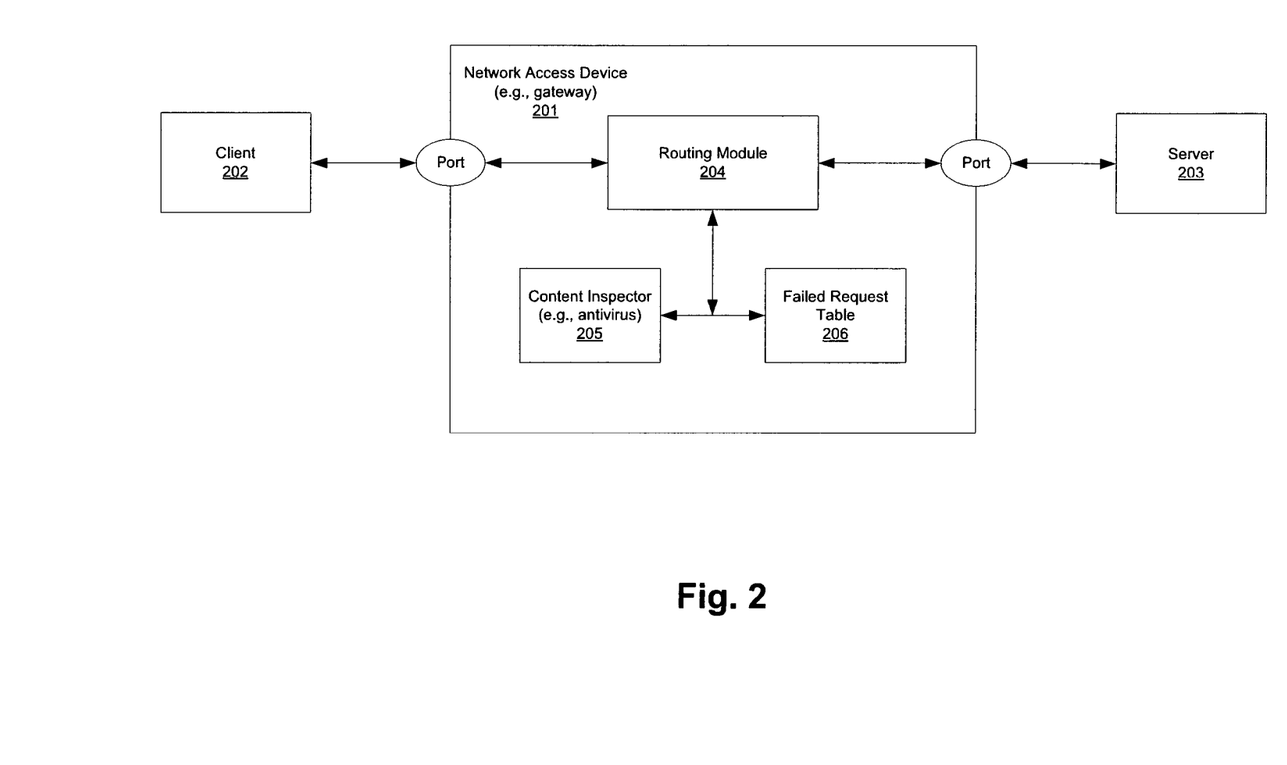
FIG. 2 is a block diagram of a network access device according to one embodiment.

FIG. 2 is a block diagram of a network access device according to one embodiment. For example, network access device 201 may be implemented as part of network device 102 of FIG. 1. Referring to FIG. 2, network access device 201 is communicatively coupled to a client 202 over a first network (e.g., LAN) and is communicatively coupled to a remote server 203 over a second network (e.g., WAN). In addition, network access device 201 includes a routing module, content scanning module 205 such as an antivirus (or anti spyware) module, and a failed request table 206. The routing module 204 is used to route data packets between client 202 and server 203. In addition, routing module 204 may invoke antivirus module 205 to perform virus or spyware scanning. The antivirus module 205 may perform reassembly-free content scanning while the routing module 204 transmitting at least a portion of the content received from server 203 to client 202.

According to one embodiment, when a Web page is received at the network access device 201, which may be requested by client 202, the network access device 201 may invoke a content scanning or filtering module 205 to perform virus and/pr spyware scanning against certain virus/spyware data patterns. When a virus/spyware is detected, the connection with the remote server 203 is terminated. As a result, the client 202 that originated the request may receive a blank page. Meanwhile, the network access device 201 may extract the URL of the Web page and/or the address (e.g., IP address) of the remote server from the request received from client 202 and store this information in a data structure 206 (also referred to as a failed request table herein). In addition, information regarding the virus/spyware may also be stored in the data structure 206. The information may include one or more reasons why the connection has been terminated in view of the detected virus and/or spyware. When a user receives a blank page, the user may not know why the previous request has failed. As a human nature, the user may retry again by "refreshing" the page from a browser application. As a result, a second request for the same Web page of the same server is transmitted from client 202 and received by the network access device 201. Note that a user may not retry by "refreshing" the page. There may not be anything specific (e.g., user guide) which tells the user how to react. However in practice most of the users behaved in this predictable manner (e.g., all "refreshed").

When the network access device 201 receives the second request, the network access device 201 may extract the URL of the requested Web page and the IP address of the server that hosts the Web page from the second request. The extracted URL and IP address may be used to compare with the information stored in table 206. If the table 206 contains the extracted URL and/or IP address, that means the requested document has been previously requested and the requested document may contain a virus and/or spyware. If the table 206 contains the extracted URL and/or IP address, the information regarding the previously detected virus and/or spyware is retrieved from table 206. This information may be used to form a reason explaining why the connection was terminated. Thereafter, a page containing the reason is then returned to the client. As a result, the client would know why the connection has been terminated. In one embodiment, the content stored in table 206 may be hashed using a hash function according to a predetermined hash algorithm such as SHA-1 or MD5, etc. Note that some or all of the components of network access device 201 may be implemented in software, hardware, or a combination of both.

Figure 3:
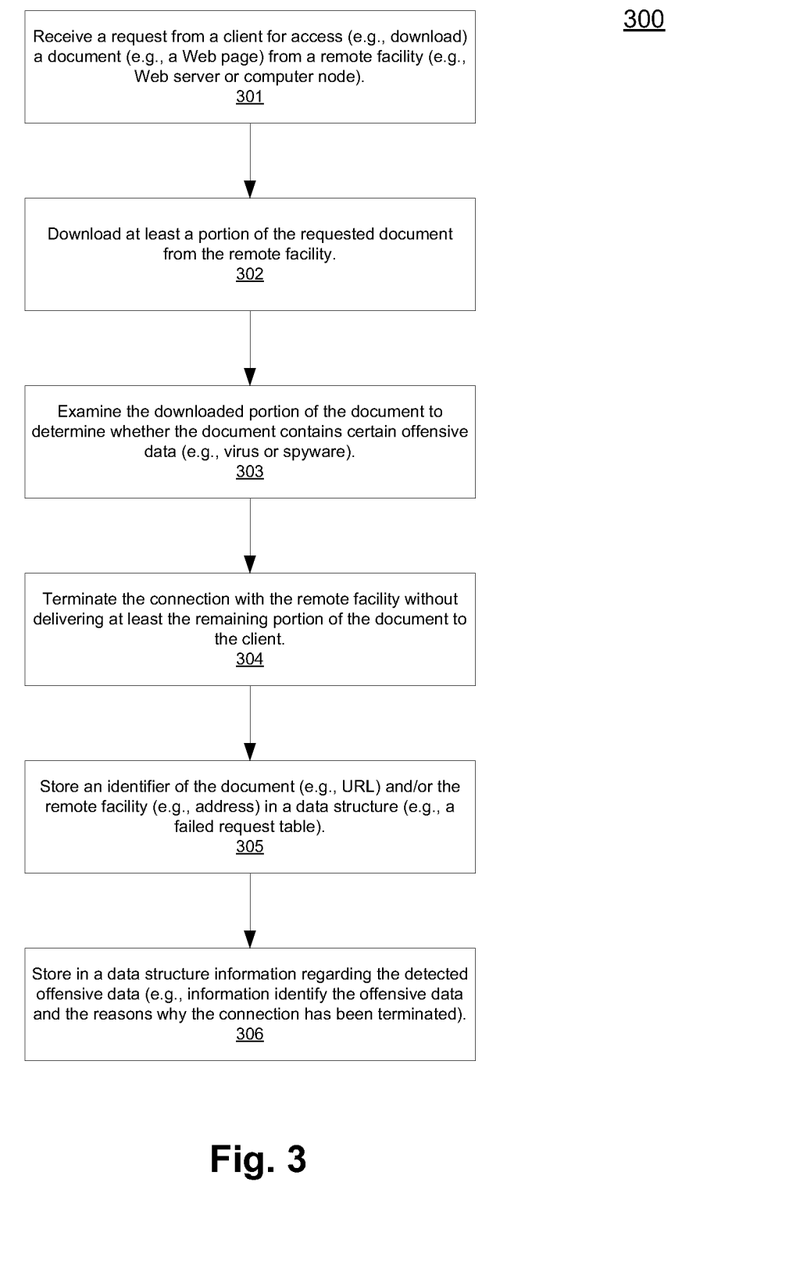
FIG. 3 is a flow diagram illustrating a process for content scanning according to one embodiment of the invention.

FIG. 3 is a flow diagram illustrating a process for content scanning according to one embodiment of the invention. Note that process 300 may be performed by processing logic which may include software, hardware, or a combination of both. For example, process 300 may be performed by network access device 201 of FIG. 2. Referring to FIG. 3, according to one embodiment, at block 301, a request is received from a client for accessing a document hosted by a remote facility (e.g., a Web page hosted by a Web server). For example, the request may be received at a network access device (e.g., gateway device) from a client of a local area network (LAN) trying to access or download a Web page of a remote Web server over a wide area network (WAN) such as Internet. At block 302, at least a portion of the requested document is downloaded from the remote facility. At block 303, the downloaded portion of the document is examined to determine whether the document contains certain offensive data, such as, for example, viruses or spywares. In one embodiment, at least a portion of the document is downloaded and examined at a network access device, for example, via an anti-virus module of the network access device. In one embodiment, the document is transmitted to the client while being examined by the network access device (also referred to as resemble-free scanning).

Once the offensive data is identified, at block 304, the connection with the remote facility is terminated and at least a portion (e.g., remaining portion) of the document would not be transmitted to the client. As result, the client would not be able to reconstruct the document and the offensive data would not be replicated. In addition, at block 305, an identifier of the document, such as, for example, the URL of the document and/or the address (e.g., IP address) of the remote facility may be stored in a data structure or database, which may be maintained locally within the network access device or remotely but accessible by the network access device. For example, the identifier of the document containing offensive data may be maintained in a failed request table as described above. At block 306, information regarding the identified offensive data may also be stored in the data structure or database. For example, information regarding the identified offensive data may include the identification of the offensive data and/or the reasons why the connection has been terminated, etc. Note that at least a portion of the document is downloaded only if the failed request data structure does not indicate that the same document has been previously requested and contains offensive data. Other information may also be included.

Figure 4:
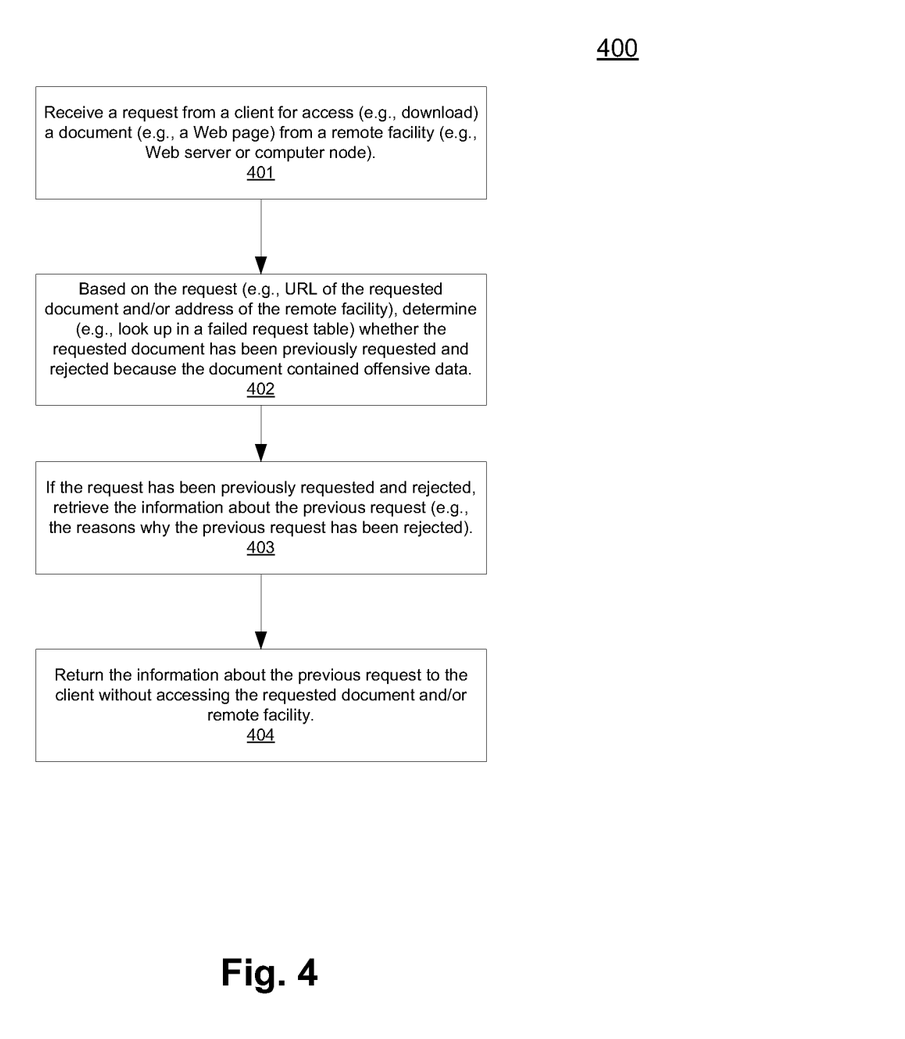
FIG. 4 is a flow diagram illustrating a process for processing such a refresh user action according to one embodiment of the invention.

Once the network connection is terminated because of the offensive data, at least a portion of the document would not be transmitted to the client. As a result, the client would not be able to reconstruct the document and may receive a blank page or a default page such as timeout notification, etc. As described above, a user of the client tends to reload the same document, for example, by clicking a "refresh" button of a browser to retry downloading the same document. FIG. 4 is a flow diagram illustrating a process for processing such a refresh user action according to one embodiment of the invention. Note that process 400 may be performed by processing logic which may include software, hardware, or a combination of both. For example, process 400 may be performed by network access device 201 of FIG. 2.

Referring to FIG. 4, at block 401, a request is received from a client for accessing a document hosted by a remote facility (e.g., a Web page hosted by a Web server). For example, such a request may be a subsequent request (e.g., a "refresh" request) from the client in response to a previous failed request because of offensive data detected in the previous request. In response to the request, at block 402, processing logic examines the failed request table to determine whether an identifier of the requested document such as the URL of the document and/or address of the remote facility can be found in a data structure or database, such as a failed request table described above. As described above, when a previous request for accessing the same document failed because of the offensive data, the identifier of the document, as well as information about the offensive data, would have been stored in the failed request table. At block 403, if the identifier of the request is found in the failed request table, processing logic retrieves the information (including the reasons why the previous access failed) regarding the offensive data from the failed request table. At block 404, the retrieved information is returned (e.g., in a HTML page) to the client without accessing the requested document of the remote facility. As a result, the client would have known the reasons why the requested document would not be obtained. Other operations may also be performed.

Figure 5:
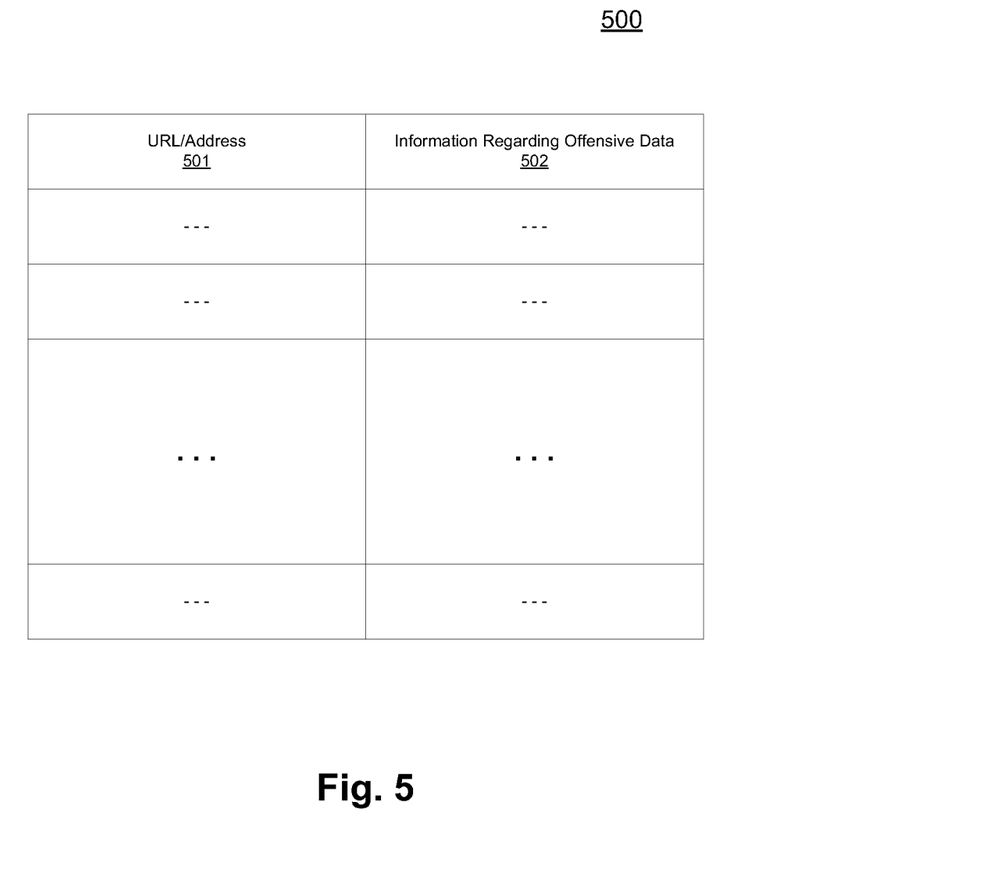
FIG. 5 is a block diagram illustrating an example of a data structure for storing information regarding previous requests according to one embodiment of the invention.

FIG. 5 is a block diagram illustrating an example of a data structure for storing information regarding previous requests according to one embodiment of the invention. For example, data structure 500 may be implemented as part of a table or database such as table 206 of FIG. 2. Referring to FIG. 5, according to one embodiment, data structure 500 may include multiple entries. Each entry includes field 501 to store an identifier of the previously requested document such as the URL and/or address of the computing node hosting the document. In addition, each entry includes field 502 to store information regarding the detected offensive data such as identification of the offensive data and/or reasons why the previous access failed. In one embodiment, field 501 and/or field 502 may be hashed using a hash function (e.g., SHA-1 or MD5) to improve storage space and speed. Further, the data structure 500 may be implemented in a LRU (least recently used) manner to further reduce the storage space.

Figure 6:
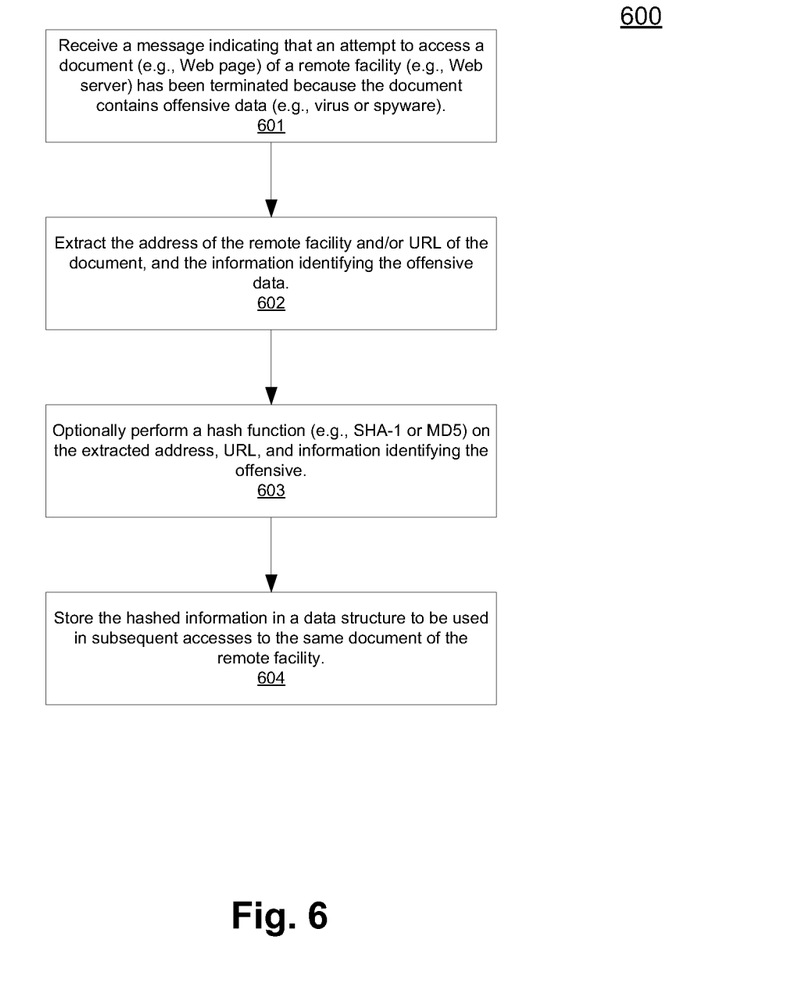
FIG. 6 is a flow diagram of a process for generating a failed request data structure according to one embodiment.

FIG. 6 is a flow diagram of a process for generating a failed request data structure according to one embodiment. Note that process 600 may be performed by processing logic which may include software, hardware, or a combination of both. For example, process 600 may be implemented as part of blocks 305 and 306. Referring to FIG. 6, at block 601, processing logic receives a message indicating that an attempt to access a document hosted by a remote facility (e.g., Web page hosted by a Web server) has been terminated because the document contains offensive data (e.g., viruses or spywares, etc.) In response to the message, at block 602, processing logic extracts the identifier of the requested document, such as the URL of the document and/or address of the remote facility. At block 603, optionally, processing logic performs a hash operation on the extracted information as well as the information identifying the offensive data using a hash algorithm (e.g., SHA-1 or MD-5). At block 604, the information is stored in a data structure (e.g., failed request table). Other operations may also be performed.

Figure 7:
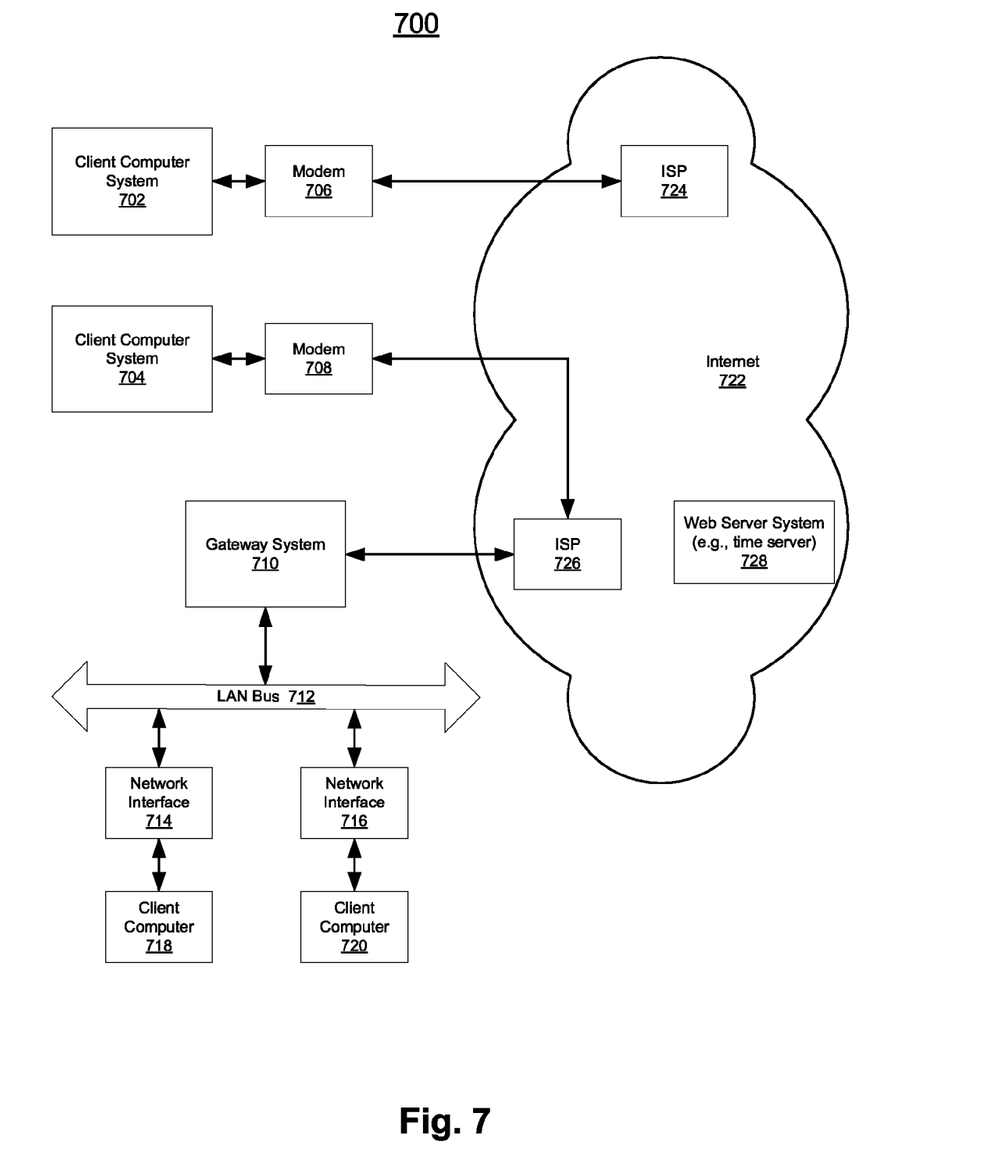
FIG. 7 is a diagram of a network of computer systems, which may be used with an embodiment of the invention.

FIG. 7 is a diagram of a network of computer systems, which may be used with an embodiment of the invention. As shown in FIG. 7, a network 700 includes a number of client computer systems that are coupled together through an Internet 722. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 722 is typically provided by Internet service providers (ISPs), such as the ISP 724, and the ISP 726. Users on client systems, such as the client computer systems 702, 704, 718, and 720, generally obtain access to the Internet through Internet service providers, such as ISPs 724 and 726. Access to the Internet may facilitate transfer of information (e.g., email, text files, media files, etc.) between two or more digital processing systems, such as the client computer systems 702, 704, 718, and 720 and/or a Web server system 728.

For example, one or more of the client computer systems 702, 704, 718, and 720 and/or the Web server 728 may provide document presentations (e.g., a Web page) to another one or more of the client computer systems 702, 704, 718, and 720 and/or Web server 728. For example, in one embodiment of the invention, one or more client computer systems 702, 704, 718, and 720 may request to access a document that may be stored at a remote location, such as the Web server 728. In the case of remote storage, the data may be transferred as a file (e.g., download) and then displayed (e.g., in a window of a browser) after transferring the file. In another embodiment, the document presentation may be stored locally at the client computer systems 702, 704, 718, and/or 720. In the case of local storage, the client system may retrieve and display the document via an application, such as a word processing application, without requiring a network connection.

The Web server 728 typically includes at least one computer system to operate with one or more data communication protocols, such as the protocols of the World Wide Web and, as such, is typically coupled to the Internet 722. Optionally, the Web server 728 may be part of an ISP which may provide access to the Internet and/or other network(s) for client computer systems. The client computer systems 702, 704, 718, and 720 may each, with appropriate Web browsing software, access data, such as HTML document (e.g., Web pages), which may be provided by the Web server 728.

The ISP 724 provides Internet connectivity to the client computer system 702 via a modem interface 706, which may be considered as part of the client computer system 702. The client computer systems 702, 704, 718, and 720 may be a conventional data processing system, such as a desktop computer, a "network" computer, a handheld/portable computer, a cell phone with data processing capabilities, a Web TV system, or other types of digital processing systems (e.g., a personal digital assistant (PDA)).

Similarly, the ISP 726 provides Internet connectivity for the client computer systems 702, 704, 718, and 720. However, as depicted in FIG. 7, such connectivity may vary between various client computer systems, such as the client computer systems 702, 704, 718, and 720. For example, as shown in FIG. 7, the client computer system 704 is coupled to the ISP 726 through a modem interface 708, while the client computer systems 718 and 720 are part of a local area network (LAN). The interfaces 706 and 708, shown as modems 706 and 708, respectively, may represent an analog modem, an ISDN modem, a DSL modem, a cable modem, a wireless interface, or other interface for coupling a digital processing system, such as a client computer system, to another digital processing system.

The client computer systems 718 and 720 are coupled to a LAN bus 712 through network interfaces 714 and 716, respectively. The network interface 714 and 716 may be an Ethernet-type, asynchronous transfer mode (ATM), or other type of network interface. The LAN bus is also coupled to a gateway digital processing system 710, which may provide firewall and other Internet-related services for a LAN. The gateway digital processing system 710, in turn, is coupled to the ISP 726 to provide Internet connectivity to the client computer systems 718 and 720. The gateway digital processing system 710 may, for example, include a conventional server computer system. Similarly, the Web server 728 may, for example, include a conventional server computer system.

In one embodiment, the local area network 712 may be local wireless network (e.g., a home network) and the gateway 710 may include a wireless access point (also referred to as a base station) to one or more clients 718 and 720 using a variety of wireless networking protocols; for example, the IEEE 802.xx protocols including Wi-Fi and/or Bluetooth protocols. In a further embodiment, the gateway 710 may access the server 728 via dialup network services using a modem.

According to one embodiment, techniques of content scanning (e.g., antivirus scanning), described above may be implemented with any of the network access devices, such as, modems 706 and 708, and/or gateway 710.

Figure 8:
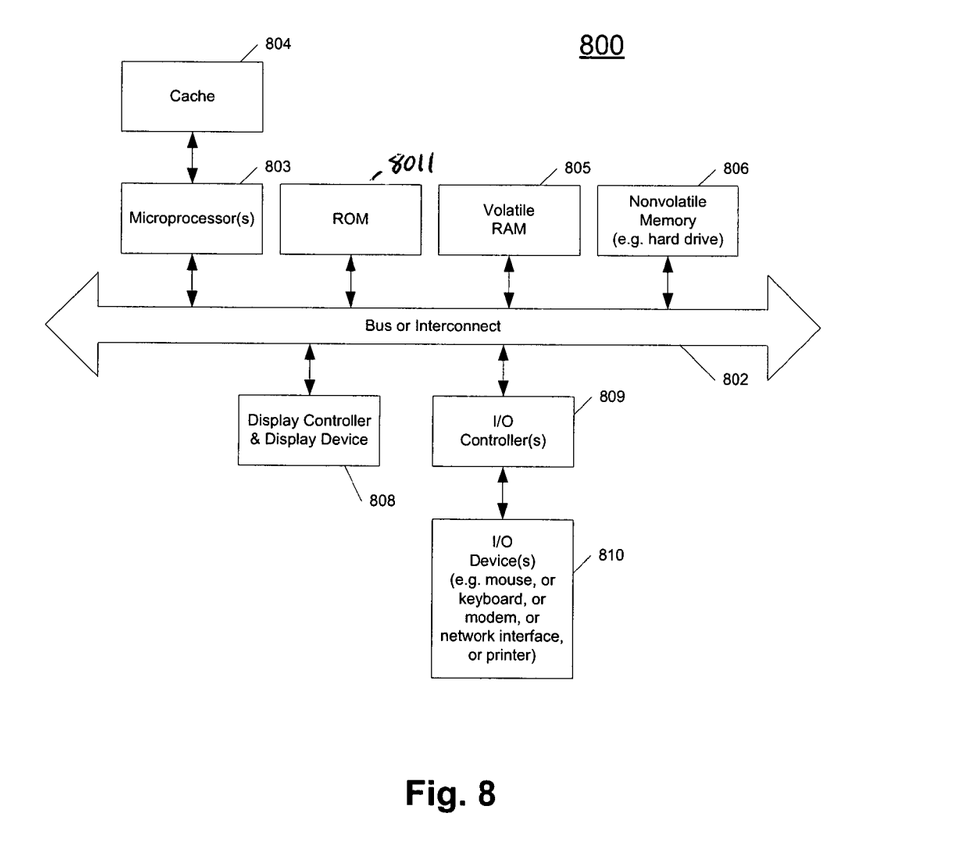
FIG. 8 is a block diagram of a digital processing system which may be used with one embodiment of the invention.

FIG. 8 is a block diagram of a digital processing system which may be used with one embodiment of the invention. For example, the system 800 shown in FIG. 8 may be used as a client computer system such as clients 704-705 of FIG. 7. Alternatively, the exemplary system 800 may be implemented as a network access device 702, etc.

Note, that while FIG. 8 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 8 may, for example, be an Apple Macintosh computer or an IBM compatible PC.

As shown in FIG. 8, the computer system 800, which is a form of a data processing system, includes a bus 802 which is coupled to a microprocessor 803 and a ROM 8011, a volatile RAM 805, and a non-volatile memory 806. The microprocessor 803, which may be, for example, an Intel processor or a PowerPC processor, is coupled to cache memory 804 as shown in the example of FIG. 8. The bus 802 interconnects these various components together and also interconnects these components 803, 8011, 805, and 806 to a display controller and display device 808, as well as to input/output (110) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus)

adapter for controlling USB peripherals. Alternatively, I/O controller 809 may include an IEEE-1394 adapter, also known as FireWire adapter, for controlling FireWire devices. Other components may also be included.

Thus, techniques of notification for reassembly-free file scanning have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for identifying offensive content, the method comprising:
   receiving a first request to retrieve a digital content dataset, the first request received from a client;
   retrieving a first portion of the digital content dataset after receiving the first request to retrieve the digital content dataset;
   transmitting the retrieved first portion of the digital content dataset to the client while retaining a copy of the first portion of the digital content dataset;
   identifying that the digital content dataset includes offensive content based on an examination of at least the retained copy of the first portion of the digital content dataset;
   blocking retrieval of at least a second portion of the digital content dataset after the digital content dataset has been identified as including the offensive content;
   transmitting a blank page dataset to the client after the blocking of the retrieval of the second portion of the digital content dataset, the blank page dataset representing a blank page;
   storing at least a data identifier into a table of failed requests, the data identifier including at least a hash value generated using a secure hash algorithm (SHA), the hash value corresponding to at least the first portion of the digital content dataset;
   receiving a second request to retrieve the digital content dataset, the second request generated using a refresh button on a browser of the client in response to receipt of the blank page dataset by the client;
   identifying that the data identifier corresponding to the first portion of the digital content dataset is stored in the table of failed requests following the receipt of the second request to retrieve the digital content dataset; and
   blocking retrieval of the digital content dataset based on the identification that the data identifier corresponding to the first portion of the digital content is stored in the table of failed requests following the receipt of the second request to retrieve the digital content dataset.

2. The method of claim 1, further comprising transmitting a message to the client, wherein the message indicates that the digital content dataset includes at least one of a virus or spyware.

3. The method of claim 1, wherein the data identifier corresponding to the first portion of the digital content dataset identifies where the first portion of the digital content dataset is stored.

4. The method of claim 1, wherein the first portion of the digital content dataset is stored locally.

5. The method of claim 4, wherein the first portion of the digital content dataset is accessible without a network connection.

6. The method of claim 4, wherein the first portion of the digital content dataset is retrieved without using a network connection.

7. The method of claim 1, wherein the first portion of the digital content dataset is stored remotely.

8. The method of claim 1, wherein the first portion of the digital content dataset is retrieved from another client computer.

9. The method of claim 1, wherein the first portion of the digital content dataset is at least one of an email, a document, a file, a text file, and a media file.

10. A non-transitory computer readable storage medium having embodied thereon a program executable by a processor to perform a method for identifying offensive content in digital content, the method comprising:

receiving a first request to retrieve a digital content dataset, the first request received from a client;

retrieving a first portion of the digital content dataset after receiving the first request to retrieve the digital content dataset;

transmitting the retrieved first portion of the digital content dataset to the client while retaining a copy of the first portion of the digital content dataset;

identifying that the digital content dataset includes offensive content based on an examination of at least the retained copy of the first portion of the digital content dataset;

blocking retrieval of at least a second portion of the digital content dataset after the digital content dataset has been identified as including the offensive content;

transmitting a blank page dataset to the client after the blocking of the retrieval of the second portion of the digital content dataset, the blank page dataset representing a blank page;

storing at least a data identifier into a table of failed requests, the data identifier including at least a hash value generated using a secure hash algorithm (SHA), the hash value corresponding to the first portion of the digital content dataset;

receiving a second request to retrieve the digital content dataset, the second request generated using a refresh button on a browser of the client in response to receipt of the blank page dataset at the client;

identifying that the data identifier corresponding to the first portion of the digital content dataset is stored in the table of failed requests following the receipt of the second request to retrieve the digital content dataset; and blocking retrieval of the digital content dataset based on the identification that the data identifier corresponding to the first portion of the digital content is stored in the table of failed requests following the receipt of the second request to retrieve the digital content dataset.

11. The non-transitory computer readable storage medium of claim 10, wherein the method further comprising transmitting a message to the client, the message indicating that the digital content dataset includes at least one of a virus or spyware.

12. The non-transitory computer readable storage medium of claim 10, wherein the data identifier corresponding to the first portion of the digital content dataset identifies where the portion of the digital content is stored.

13. The non-transitory computer readable storage medium of claim 10, wherein the first portion of the digital content dataset is stored locally.

14. The non-transitory computer readable storage medium of claim 13, wherein the first portion of the digital content dataset is accessible without a network connection.

15. The non-transitory computer readable storage medium of claim 13, wherein the first portion of the digital content dataset is retrieved without using a network connection.

16. The non-transitory computer readable storage medium of claim 10, wherein the first portion of the digital content dataset is stored remotely.

17. The non-transitory computer readable storage medium of claim 10, wherein the first portion of the digital content dataset is retrieved from another client computer.

18. The non-transitory computer readable storage medium of claim 10, wherein the first portion of the digital content dataset is at least one of an email, a document, a file, a text file, and a media file.

19. A system for identifying offensive content in digital content, the system comprising:

a network interface communicatively coupled to at least a client, the network interface to receive a first request to retrieve a digital content dataset from the client, the network interface to later receive a second request to retrieve the digital content dataset;

a memory to store at least a table of failed requests; and a processor coupled to the memory and to the network interface, wherein execution of instructions stored in the memory by the processor:

retrieves a first portion of the digital content dataset after receiving the first request to retrieve the digital content dataset, transmits the retrieved first portion of the digital content dataset to the client via the network interface while retaining a copy of the first portion of the digital content dataset, identifies that the digital content dataset includes offensive content based on examination of at least the retained copy of the first portion of the digital content dataset, blocks retrieval of at least a second portion of the digital content dataset after the digital content dataset has been identified as including the offensive content, transmits a blank page dataset to the client after the blocking of the retrieval of the second portion of the digital content dataset, the blank page dataset representing a blank page, stores at least a data identifier into a table of failed requests, the data identifier including at least a hash value generated using a secure hash algorithm (SHA), the hash value corresponding to the first portion of the digital content dataset, identifies, following receipt of the second request to retrieve the digital content dataset, that the data identifier corresponding to the first portion of the digital content dataset is stored in the table of failed requests, the second request generated using a refresh button on a browser of the client in response to receipt of the blank page dataset by the client, and blocks retrieval of the digital content dataset based on the identification that the data identifier corresponding to the first portion of the digital content dataset is stored in the table of failed requests following the receipt of the second request to retrieve the digital content dataset.

20. The system of claim 19, further comprising a server storing the digital content dataset, wherein the network interface is also communicatively coupled to the server.

* * * * *